US005946492A

United States Patent [19]

Bates

[11] Patent Number: 5,946,492
[45] Date of Patent: Aug. 31, 1999

[54] COMPILER THAT REDUCES CALL STACK SIZE THROUGH IDENTIFICATION OF STACKLESS VARIABLES

[75] Inventor: Cary Lee Bates, Rochester, Minn.

[73] Assignee: International Business Machines Corporation, Armonk, N.Y.

[21] Appl. No.: 08/803,050

[22] Filed: Feb. 19, 1997

[51] Int. Cl.[6] .................................................. G06F 9/45
[52] U.S. Cl. ............................................................ 395/709
[58] Field of Search .................................. 395/709, 708, 395/705, 680, 704

[56] References Cited

U.S. PATENT DOCUMENTS

| | | | |
|---|---|---|---|
| 5,355,494 | 10/1994 | Sistare et al. | 395/706 |
| 5,481,708 | 1/1996 | Kukol | 395/709 |
| 5,515,535 | 5/1996 | Frankel et al. | 395/706 |
| 5,530,866 | 6/1996 | Koblenz et al. | 395/708 |
| 5,628,016 | 5/1997 | Kukol | 395/704 |
| 5,642,512 | 6/1997 | Tanaka et al. | 395/705 |
| 5,659,754 | 8/1997 | Grove et al. | 395/709 |
| 5,761,514 | 6/1998 | Aizikowitz et al. | 395/709 |

*Primary Examiner*—James P. Trammell
*Assistant Examiner*—Matthew Smithers
*Attorney, Agent, or Firm*—Steven W. Roth

[57] ABSTRACT

The present invention uses an optimizing compiler to identify what are referred to herein as stackless variables. A variable is said to be stackless for a given call statement if the calling program does not have a need for the information stored in the variable when the calling program resumes execution after the program that is the subject of the call statement returns control of the processor to the calling program. The decision of whether a variable is stackless or not for a given call statement is made within the preferred embodiment by determining whether the live range of the particular variable spans the location of the call statement in question. If a variable's live range is found to cross the location of the call statement, it is not considered stackless. However, if a variable's live range is not found to cross the location of the call statement, it is considered to be stackless for that particular call statement.

18 Claims, 12 Drawing Sheets

COMPILER MAIN()

| Var. | Cnt. | Size | Taken |
|------|------|------|-------|
|      |      |      |       |
|      |      |      |       |
|      |      |      |       |
|      |      |      |       |
|      |      |      |       |
|      |      |      |       |
|      |      |      |       |
|      |      |      |       |

CALL COUNTER

| Var. | Cnt. | Size | Taken |
|------|------|------|-------|
| i    | 2    | 4    | 0     |
| j    | 1    | 4    | 0     |
|      |      |      |       |
|      |      |      |       |
|      |      |      |       |
|      |      |      |       |
|      |      |      |       |

405 → i row
410 → j row

FIG. 4

CALL REWRITE MECHANISM

CALL REWRITE MECHANISM CONTINUED

COMPILER THAT REDUCES CALL STACK SIZE THROUGH IDENTIFICATION OF STACKLESS VARIABLES

FIELD OF THE INVENTION

The present invention relates to data processing systems. More particularly, the present invention relates to an optimizing compiler mechanism.

BACKGROUND OF THE INVENTION

The use and the popularity of computer systems have steadily increased since around the middle of the twentieth century. While this trend has been fueled by many different advances in computer system technology, the fact remains that many of the components that are found in today's computer systems were present in even some of the earliest systems. Two of these computer system components are the computer system's processor and its memory.

As is well known, information (called data) is stored in a the computer system's memory. This memory is generally categorized into two types. While there are various names used to characterize these two basic types of computer system memory, the terms used in this patent are "main memory" and "auxiliary storage." In general, main memory is used by the computer system to store information that is of current interest to the programs executing on the computer system's processor. Auxiliary storage, on the other hand, is used to store the information that is not currently needed by the programs.

Auxiliary storage devices, which are sometimes referred to as mass storage devices, generally have much greater storage capability than that of main memory. However, the time it takes to access the information is generally much longer than that of main memory. This is why computer systems move needed information from the larger/slower mass storage devices into the smaller/faster main memory before operating on the information. As one can imagine, though, main memory is much more expensive than auxiliary storage. The difference in expense is so significant that computer system designers are constantly struggling with the problem of reducing the need for main memory. This problem is particularly acute in small imbedded systems, where the margin between cost and market price is especially slim. Another situation where main memory space is at a premium is the case of devices that do not include auxiliary storage (e.g., medialess personal computers and network stations).

While there are a variety of avenues that can be taken to reduce the amount of main memory that is needed in a computer system, one intuitive approach is to reduce each computer program's need for main memory. Broadly speaking, computer programs use main memory in two ways. First, since programs must be loaded into main memory to execute, the very size of a computer system's individual programs will to some degree dictate the amount of main memory that is needed. Second, programs need main memory space while they are executing. While this need for main memory applies to a variety of main memory constructs, this patent pertains to a main memory construct that is referred to as automatic storage or stack space.

The stack (i.e., the physical entity that is said to take up the stack space) is used to store status information about executing programs so that programs can call one another. When one program calls another program, status information about the calling program is stored on the stack so that the calling program can resume its processing after the called program returns control of the processor to the calling program. Amongst other pieces of information, this status information will often include what are referred to as automatic variables. Automatic variables are used during execution of a program and are stored on the stack so that the calling program can have access to them after the program resumes its processing.

The problem with the way automatic variables are handled in existing computer systems is that every automatic variable is stored on the stack, regardless of whether each and every variable is needed when the calling program resumes execution. From the above discussion it can be readily seen that the "store everything" approach of prior art mechanisms is extremely wasteful in a world where main memory space is at such a premium.

Without a mechanism that can more efficiently handle automatic variable storage, expensive main memory will continue to be wasted by prior art mechanisms.

SUMMARY OF THE INVENTION

The present invention uses an optimizing compiler to identify what are referred to herein as stackless variables. A variable is said to be stackless for a given call statement if the calling program does not have a need for the information stored in the variable when the calling program resumes execution after the program that is the subject of the call statement returns control of the processor to the calling program. The decision of whether a variable is stackless or not for a given call statement is made within the preferred embodiment by determining whether the live range of the particular variable spans the location of the call statement in question. If a variable's live range is found to cross the location of the call statement, it is not considered stackless. However, if a variable's live range is not found to cross the location of the call statement, it is considered to be stackless for that particular call statement. When a stackless variable for a given call statement is encountered, the compiler will rewrite the call statement such that called program is able to use the space on the stack that would have otherwise been taken up by the stackless variable.

These and other features of the present invention will be explained in further detail in the text associated with the following drawings.

BRIEF DESCRIPTION OF THE DRAWINGS

FIG. 2B is a diagram that shows the structure of the automatic variable table of the preferred embodiment.

FIG. 4 is a diagram that shows how an automatic variable table would appear after the code segment of FIG. 2C was processed by the call counter of the preferred embodiment.

DESCRIPTION OF THE PREFERRED EMBODIMENT

Overview—Statements, Instructions, and Compilers

For those readers who are not compiler experts, a brief overview of compilers is presented here.

Computer programs are constructed using one or more programming languages. Like words written in English, a programming language is used to write a series of statements that have particular meaning to the drafter (i.e., the programmer). Once the programmer has drafted their computer program in the human readable form (called source code) prescribed by the programming language, the computer programmer uses mechanisms that change the human readable form of the computer program into a form that can be understood by a computer system (called machine code). These mechanisms are typically called compilers; however it should be understood that the term "compiler", as used within this specification, generically refers to any mechanism that transforms one representation of a computer program into another representation of that program.

This machine code is a stream of binary instructions (i.e., ones and zeros) that are meaningful to the computer. The compiler typically compiles each human readable statement into one or more machine readable instructions. Often times, these instructions have what are called mnemonics associated with them. Mnemonics are used to allow computer programmers to determine the exact instructions that are being generated by the compiler for each statement. Special compilers, called optimizing compilers, operate on the instruction stream to make it perform better (e.g., by eliminating unneeded instructions, etc.). Some optimizing compilers are wholly separate while others are built into a primary compiler (i.e., the compiler that converts the human readable statements into machine code) to form a multi-pass compiler. In other words, the first pass of multi-pass compiler operates to convert source code into an instruction stream or into an intermediate form and then performs subsequent steps (i.e., as further passes) to optimize what was previously generated.

DETAILED DESCRIPTION

Figure 1:
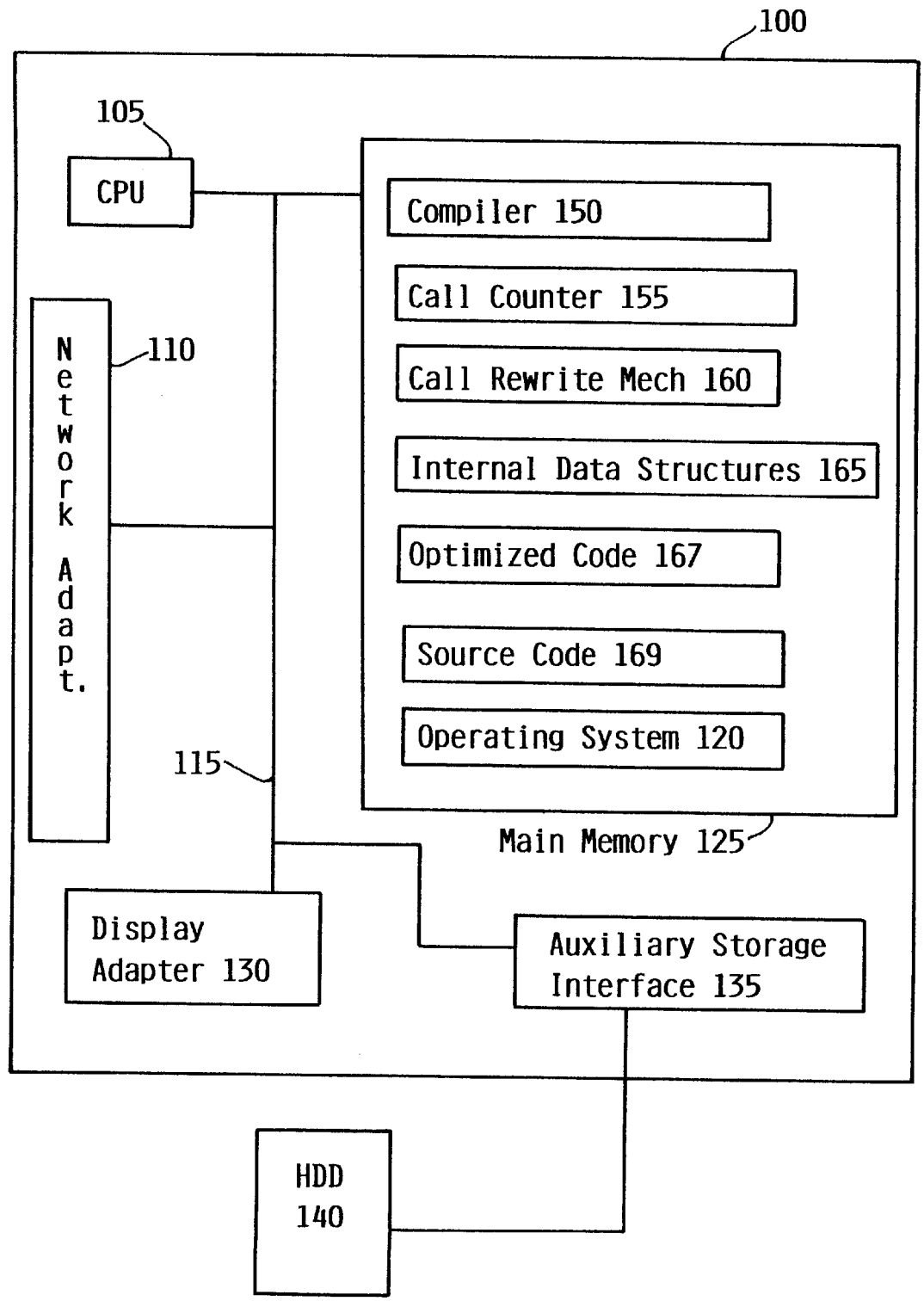
FIG. 1 is a block diagram of the computer system that is used in the preferred embodiment of the present invention.

Turning now to the drawings, FIG. 1 is a block diagram of the computer system of the preferred embodiment. Computer system 100 is an enhanced IBM Personal Computer 350 P100; however, it should be understood that the present invention is not limited to any one computer system or type of computer system. As shown, computer system 100 comprises main or central processing unit (CPU) 105, which is connected to main memory 125, display adapter 130, auxiliary storage adapter 135, and network adapter 110. These system components are interconnected through the use of system bus 115.

CPU 105 is a 100 MHz. Pentium Processor made by Intel Corporation. However, it should be understood that the present invention is not limited to any one make of processor and that the invention could be practiced using some other type of a processor such as a co-processor or an auxiliary processor. Auxiliary storage adapter 135 is used to connect mass storage devices (such as Hard Disk Drive 140) to computer system 100.

As shown, main memory 125 contains compiler 150, call counter 155, call rewrite mechanism 160, and internal data structures 165, optimized code 167, source code 169, and operating system 120. Compiler 150, call counter 155, call rewrite mechanism 160, and internal data structures 165 are the mechanisms of the preferred embodiment that are used to identify and handle stackless variables within procedures. Optimized code 167 is the machine code that is generated when the source code 169 is operated on by compiler 150.

Computer system 100 utilizes well-known virtual addressing mechanisms that allow its programs to behave as if they have access to a single, large storage entity (i.e., instead of access to multiple, smaller storage entities such as main memory 125 and HDD 140). Therefore, while compiler 150, call counter 155, call rewrite mechanism 160, internal data structures 165, and operating system 120 are shown to reside in main memory 125, those skilled in the art will recognize that these programs are not necessarily all completely contained in main memory 125 at the same time. For example, portions of operating system 120 will reside in main memory 125 while executing on CPU 105, but will at other times reside on HDD 240. (The term memory is used herein to generically refer to storage that spans the entire virtual address space of a computer system, irrespective of the particular physical devices that make up that storage.) We should further point out here that the programs shown in main memory 125 need not necessarily all simultaneously reside on computer system 100. Indeed, this latter scenario would likely be the case if computer system 100 were a network computer, and therefore, be dependent upon an on-demand shipping mechanism for access to mechanisms or portions of mechanisms that resided on a server.

Display adapter 130 is used to directly connect a display device to computer system 100. Network adapter 110 is used to connect computer system 100 to other computer systems.

As a final preliminary matter, it is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media, such as floppy disks, hard disk drives, and CD ROMs and transmission type media, such as digital and analog communications links.

Figure 2A:
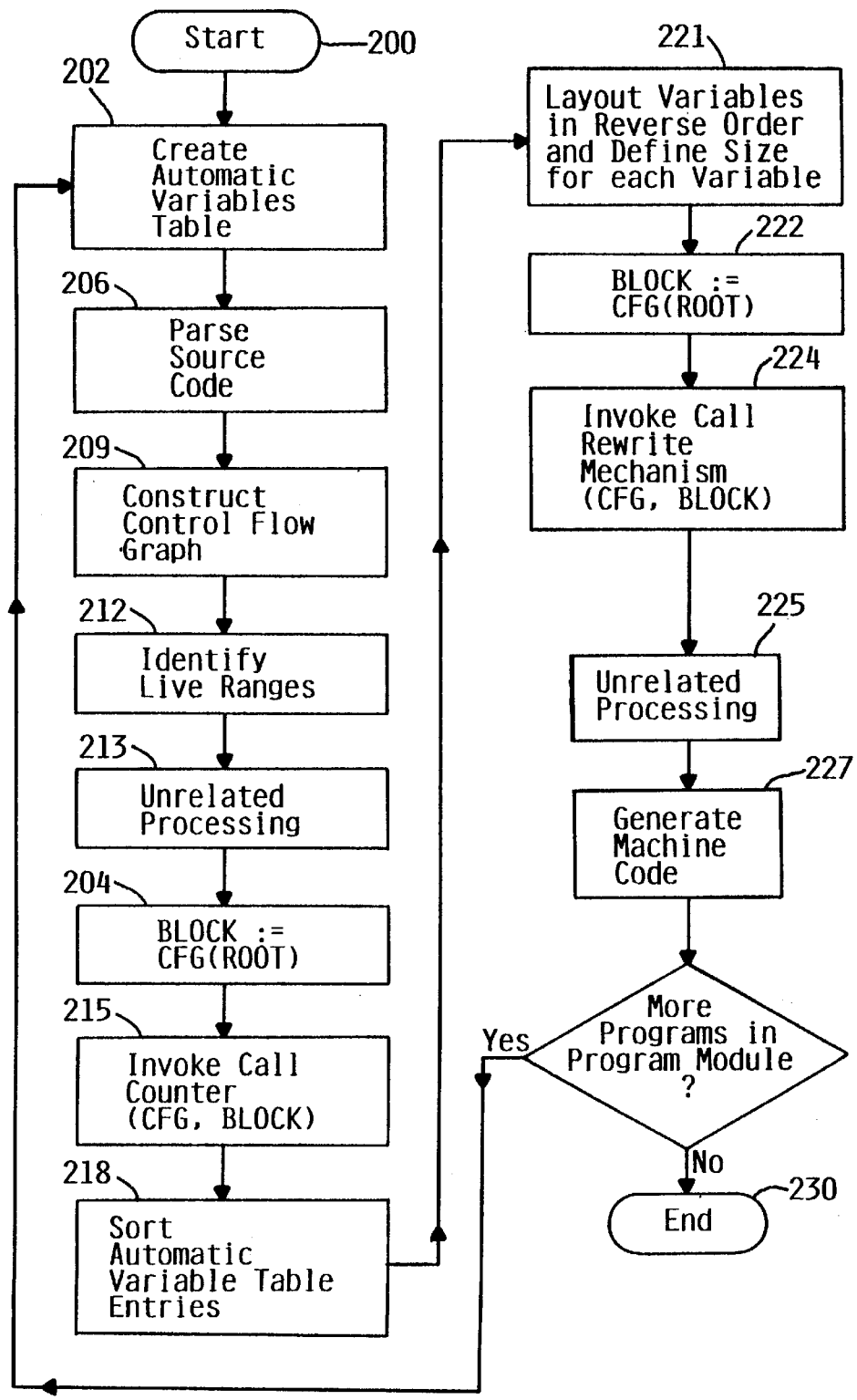
FIG. 2A is a diagram that shows steps used to carry out certain processing within the compiler of the preferred embodiment.

FIG. 2A is a diagram that shows steps used to carry out certain processing within the compiler of the preferred embodiment. Compiler 150 begins processing in block 200. Its task is to identify and handle stackless variables. Although mentioned earlier, it should be explicitly pointed out that the question of whether a variable is considered stackless is made relative to a specific call statement, such that a given variable may be stackless relative to one call statement, but not stackless relative to another call statement. For claim purposes, a variable is said to be stackless for a given program when its value is needed by the program upon return from at least one call to another program. Said another way, a variable is said to be stackless vis-à-vis a program if it is considered stackless relative to at least one call statement within the program.

The unit of operation of compiler 150 is a program module, with the unit of optimization of compiler 150 being the individual programs contained within a program module. These program modules are shown on FIG. 1 as source code 169. Please note also that the term program is used here in to refer to executable entities that have a defined beginning and a defined end. Other interchangeable terms of art include the terms procedure, function, and routine.

Figure 2B:
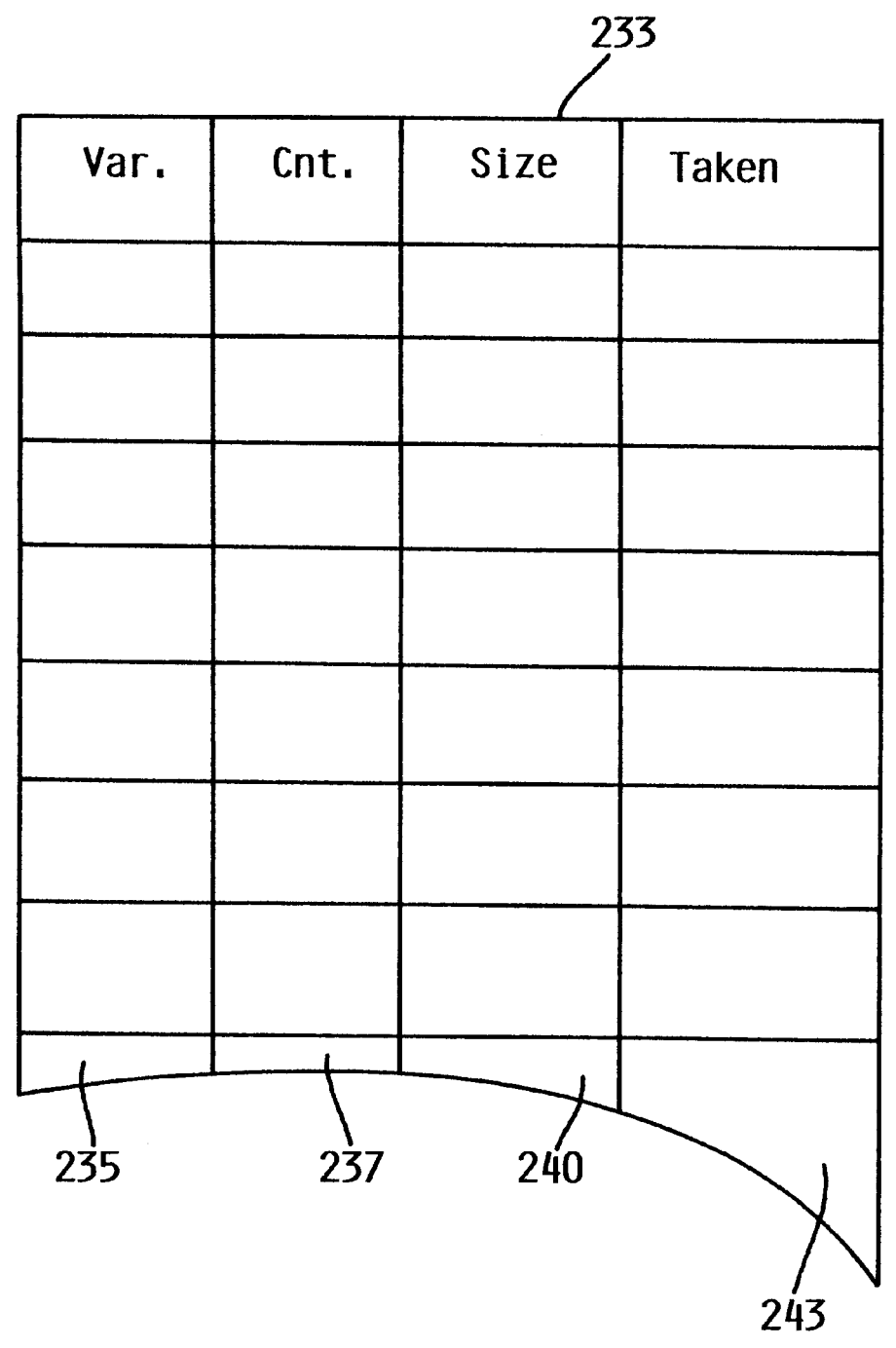

In processing block 202, compiler 150 creates an automatic variable table for the program it is about to optimize. (Compiler 150 creates one automatic variable table for each program within a program module.) The automatic variable table is represented on FIG. 1 as internal data structures 165. The structure of the automatic variable table of the preferred embodiment is shown on FIG. 2B. As shown, the automatic variable table of the preferred embodiment comprises five columns. Variable column 235 is used to store the names of the individual variables within a program. Call count column 237 is used store values that represent the number of call statements within the program for which the subject variable is not needed when the calling program resumes execution after the called program finishes executing. Size column 240 is used to store the size of each variable. Taken column 243 is used to mark variables having an address that has been "taken." This last column is explained in the text associated with parsing block 206.

Processing block 206 fundamentally involves the standard source code parsing that is well known to those skilled in the compiler art. Readers seeking more information on parsing should refer to the book entitled: *Compilers—Principles, Techniques, and Tools* by Aho et al., ISBN 0-201-10088-6. This book is referred to hereafter as "Aho." One additional processing step that occurs in the parsing phase is the identification of variables whose address has been "taken." This terminology is used herein to describe source code constructs that expose a variable's address. In the C programming language for example an ampersand (&) is used to expose the address of a variable, such that the statement a=&b will cause the address of the variable b to be stored in the variable a. When the parsing processing of processing block 206 encounters a variable whose address is taken, it will mark the variable as taken within the automatic variable table. The stackless variable optimization of the preferred embodiment is not performed for variables whose address is taken because the incremental stack size savings that could result from analyzing variables with taken addresses does not justify the added complexity. Those skilled in the art, however, will appreciate that the preferred embodiment could be extended to include such an analysis without the loss of generality.

Figure 2C:
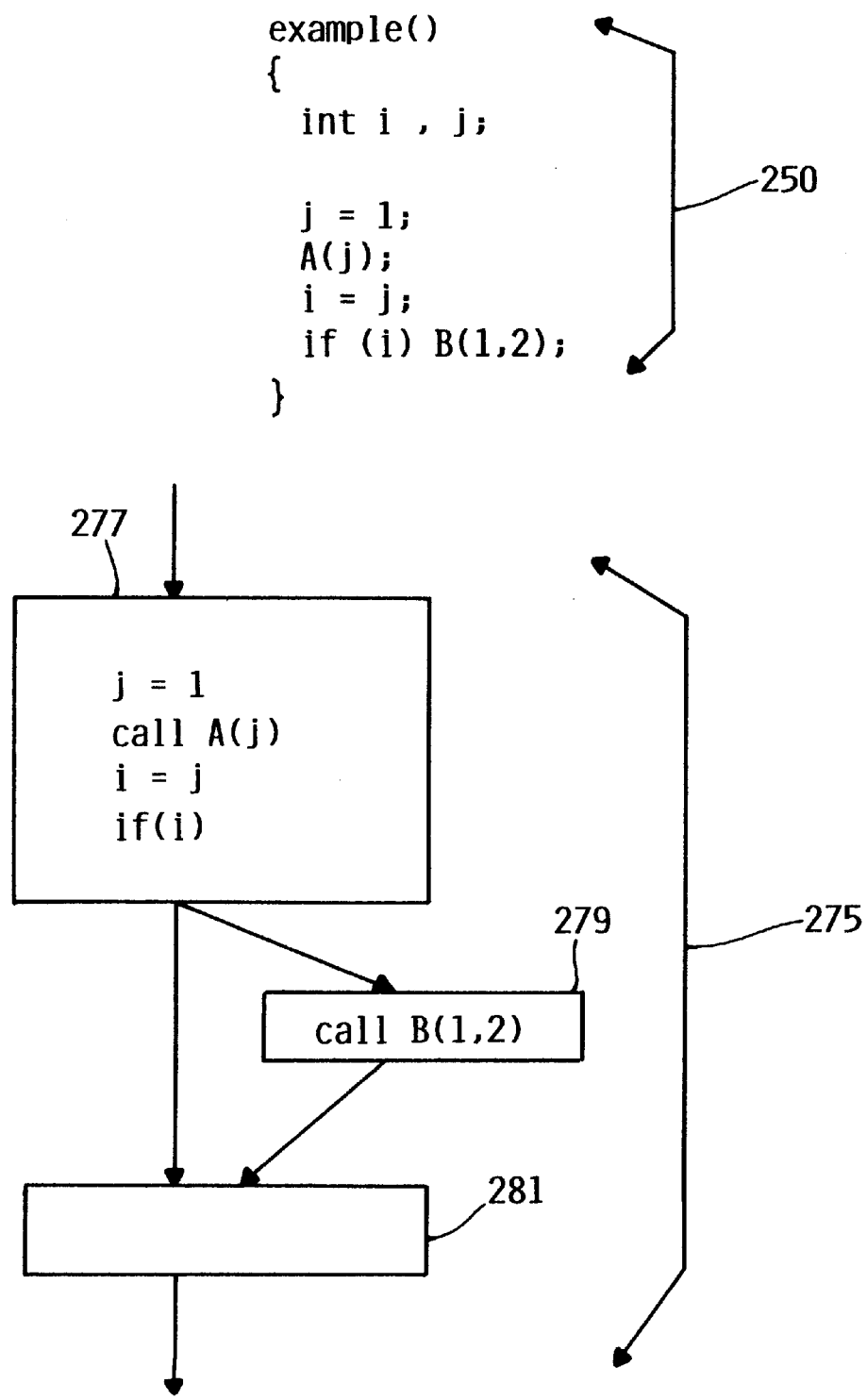
FIG. 2C is a diagram that shows an example program and the associated control flow graph.

Processing block 210 fundamentally involves the standard control flow graph construction that is well known in the compiler art. Readers seeking more information on control flow graph construction should again refer to the Aho compiler book cited above. FIG. 2C shows the source code of an example program (example ( ) 250) and the associated control flow graph (control flow graph 275) that results from the processing of processing block 210. This example program will be used throughout the remainder of this patent to explain the advantages and benefits of the present invention. While this example program is written using the C programming language, it should be understood that the present invention is not limited to any one programming language. Control flow graph 275 comprises three basic blocks. As defined in Aho, a basic block is "a sequence of consecutive statements in which flow of control enters at the beginning and leaves at the end without halt or possibility of branching except at the end." Basic block 277 represents the straight-line code sequence that precedes the conditional branch surrounding the call to the program B. Basic block 279 represents the call to program B, and basic block 281 represents the end of the program (by convention).

Once the source code has been parsed and the control flow graph has been constructed, each basic block is annotated with information that is later used to determine which variables values are needed by the calling program after it resumes execution after the called program terminates and returns control to the calling program. In the preferred embodiment, these annotations consist of information about which variables have live ranges that span the call statements in each basic block. This processing occurs in processing block 212. It should be noted, however, that the present invention is not limited to the use of live range information for determining which variables are needed by the calling program after it resumes execution. For example, a liveness approach with provision for run away lifetimes could also be used.

The phrase live range is used herein consistently with its definition in the paper: *The Priority-Based Coloring Approach to Register Allocation*, by Chow and Hennessy. This paper was published in ACM Transactions on Programming Languages and Systems, Vol. 12, No. 4, October 1990, Pages 501–536. As defined in § 4.1 (page 508) of Chow, a "live range is the intersection of the set of program graph nodes in which the variable is live and the set of nodes in which it is reaching." The register linkage convention used in the preferred embodiment is the callee-saved environment, as defined in § 506 (pages 506–507) of Chow. (As a note on nomenclature, the terms caller and callee are respectively used interchangeably with the terms calling and called). However, those skilled in the art will appreciate that only slight change to the preferred embodiment would be necessary to accommodate a caller-saved environment. Therefore, a caller-saved embodiment of the present invention is equivalent in the patent law sense.

Figure 3A:
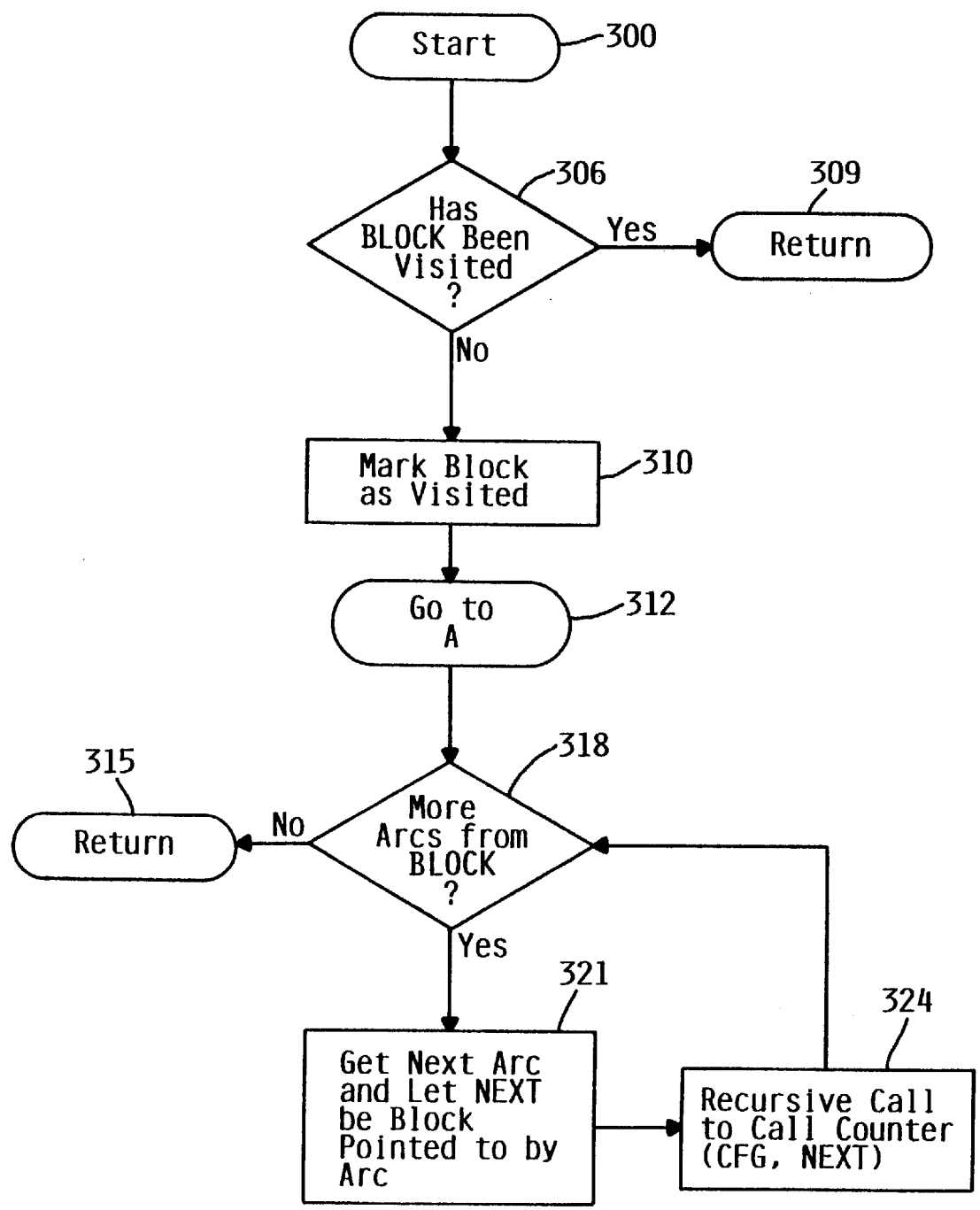
FIGS. 3A and 3B are diagrams that show the steps used to carry out the processing of the call counter of the preferred embodiment.
Figure 3B:
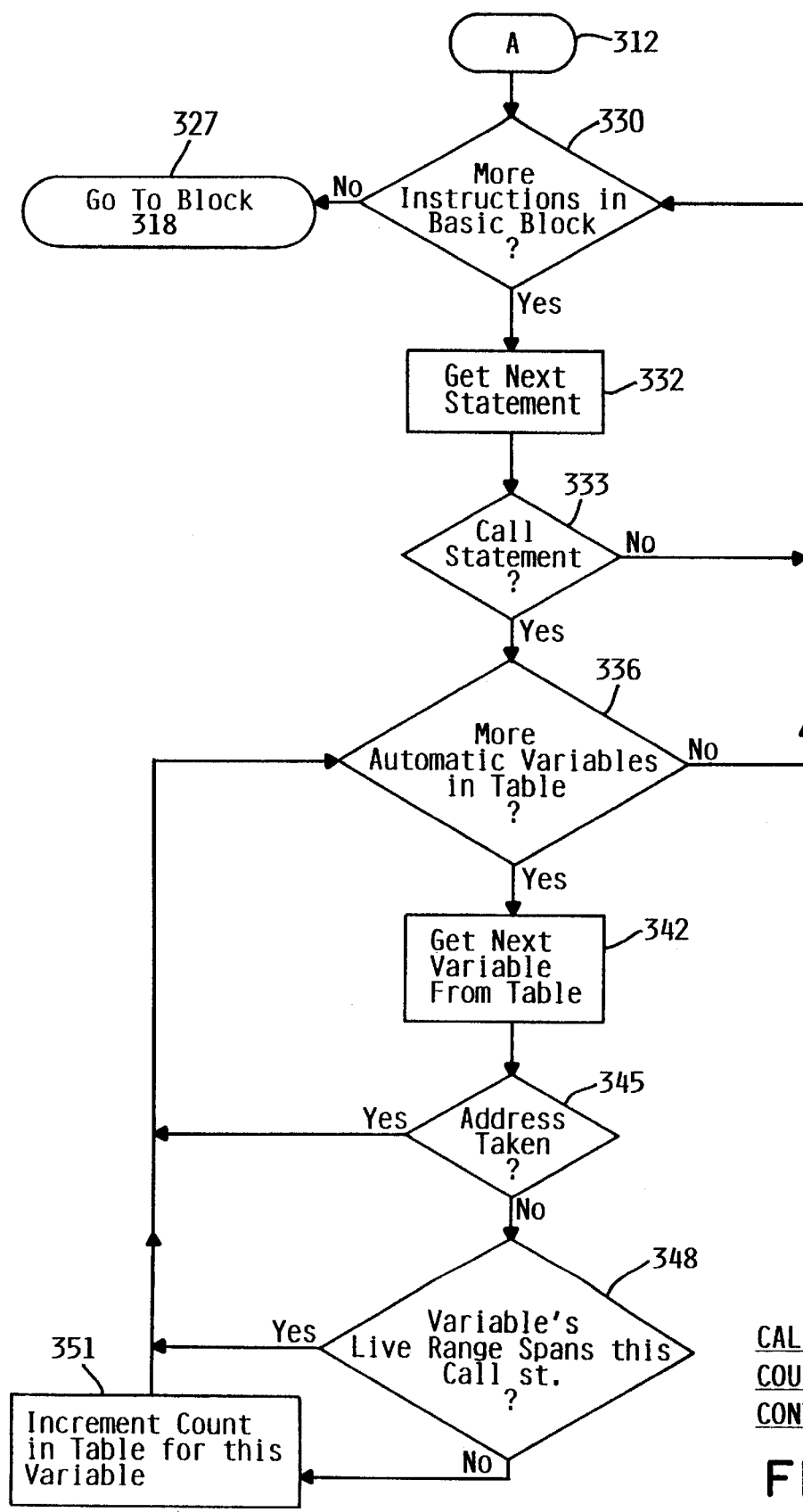

After certain unrelated processing occurs {processing block 213 }, compiler 150 sets the program variable BLOCK to the ROOT of the control flow graph and invokes call counter 155 with the control flow graph and the variable BLOCK as passed parameters {processing block 215}. FIGS. 3A and 3B are diagrams that show the steps used to carry out the processing of call counter 155. Call counter 155 begins its processing in processing block 300 after having been invoked and passed the control flow graph and BLOCK by compiler 150. In processing block 306 call counter 155 investigates a basic block in the control flow graph and determines whether that basic block has been visited before. When call counter 155 finds a basic block (BLOCK) that has been visited, it knows that its processing of the control flow graph is complete, so it returns control of CPU 105 to the calling program {processing block 309}. It should be noted that call counter 155 is a recursive program, which means that the calling program will either be compiler 150 or a previous instance of call counter 155.

When call counter 155 finds a basic block that has not been previously processed, it marks the basic block as having been visited {processing block 310} and proceeds to processing block 330 of FIG. 3B (via connector block 312). In processing block 330, call counter 155 checks whether all of the statements within the subject basic block have been processed. If not, call counter 155 proceeds to processing block 318 of FIG. 3A. If there are more statements to process, call counter 155 gets the next statement {processing block 332} and determines whether the retrieved statement is a call statement {processing block 333}. If not, call counter 155 continues to retrieve statements until a call statement is encountered or all of the statements in the basic block have been considered {processing blocks 330, 332, and 333}. If a call statement in encountered in processing block 333, call counter 155 determines whether each variable in the automatic variables table for the subject program has a live range that spans the particular call statement. Processing blocks 336 through 351 represent this processing. Call counter 155 first checks whether there are more automatic variables present in the automatic variables table that must be considered for this call statement {processing block 336}. If not, call counter 155 moves back to processing block 330 and continues to look for additional call statements.

If there are additional variables that need to be considered for the subject call statement, call counter 155 gets that next variable from the automatic variable table {processing block 342} and determines whether its address has been taken (i.e., through reference to the automatic variables table) {processing block 345}. If the particular variable's address has been taken, call counter 155 moves back to processing block 336 to consider other variables in the automatic variable table. If the particular variable's address has not been taken, call counter 155 will determine whether the variable's live range spans the location of the call statement at issue {processing block 348}. If so, call counter 155 moves back to processing block 336 to consider other variables in the automatic variable table. If the variable's live range does not span the location of the particular call statement, call counter 155 increments the call count in the automatic variables table for this variable {processing block 351 }, and then moves back to processing block 336 to consider other variables in the automatic variable table. When all of the automatic variables have been considered for all of the call statements within a basic block, call counter 155 moves back to processing block 318 of FIG. 3A {see connector block 327}.

In processing block 318, call counter 155 determines whether there are more arcs (branches to other basic blocks) that leave the basic block being processed. If not, call counter 155 returns control of CPU 105 to a previously invoked instance of call counter 155 or to compiler 150. If there are more arcs out of the subject basic block, call counter 155 assigns the program variable NEXT to the basic block associated with the arc under consideration {processing block 321 } and makes a recursive call to itself with the control flow graph and the variable NEXT as passed parameters {processing block 324}. When this newly called instance of call counter 155 returns, the calling instance of call counter 155 will again determine if there are still more arcs from the subject basic block. This process will continue {processing blocks 318 through 324} until all of the arcs and all of the subarcs in the control flow graph have been processed. This processing has the effect of considering each call statement in each basic block of a control flow graph and updating the call count for each variable to reflect the number of times the subject variable does not have a live range that spans a call statement.

FIG. 4 is a diagram that shows how an automatic variable table would appear after the code segment of FIG. 2C was processed by call counter 155. Variable 405 ("i") has a live range that does not span any call statements, which means that its call count value is 2 (i.e., because the program example( ) has two call statements, neither of which is spanned by the live range of the variable "i"). Variable 410 ("j") has a live range that spans one call statement and does not span the other call statement (i.e., the call to program B( )), which means that it has a call count of one.

After the call counts have been calculated and inserted in the automatic variable table by call counter 155, call counter 155 returns control of CPU 105 to compiler 150. Returning now briefly to FIG. 2A and the discussion of compiler 150, compiler 150 uses the call count values in the automatic variable table to sort the entries from most to least {processing block 218} and place the size of each variable in the automatic variable table {processing block 221}. (Note that alignment requirements may call for a size allocation that exceeds the size of the variable itself.) Once the table has been sorted and the variable sizes put in place, compiler 150 will set the program variable BLOCK to be equal to the ROOT of the control flow graph {processing block 222} and invoke call rewrite mechanism 160 with the control flow graph and the program variable BLOCK as passed parameters {processing block 224}.

Figure 5A:
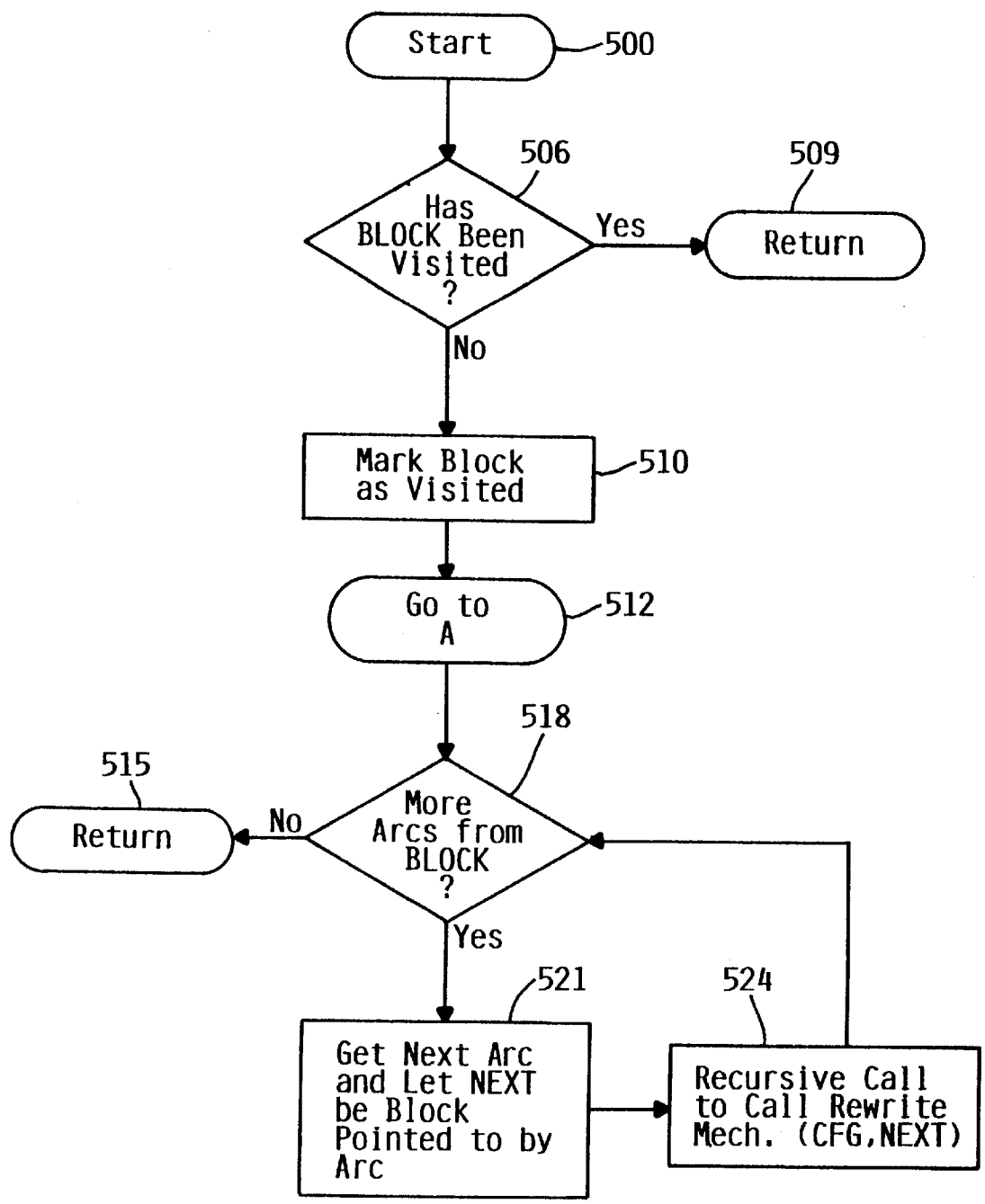
FIGS. 5A and 5B are diagrams that show the steps used to carry out the processing of the call rewrite mechanism of the preferred embodiment.
Figures 1, 5B:
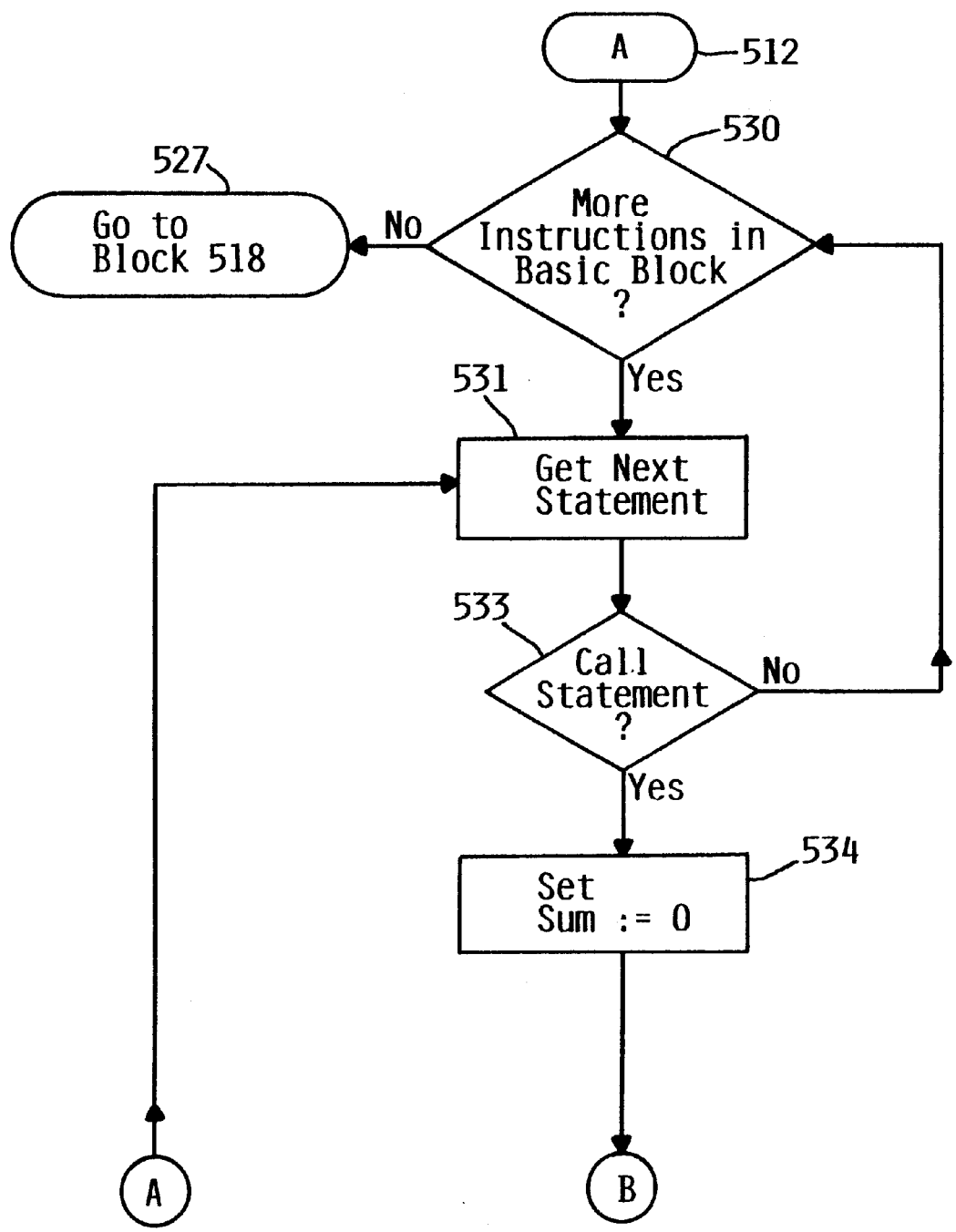
Figures 2, 5B:
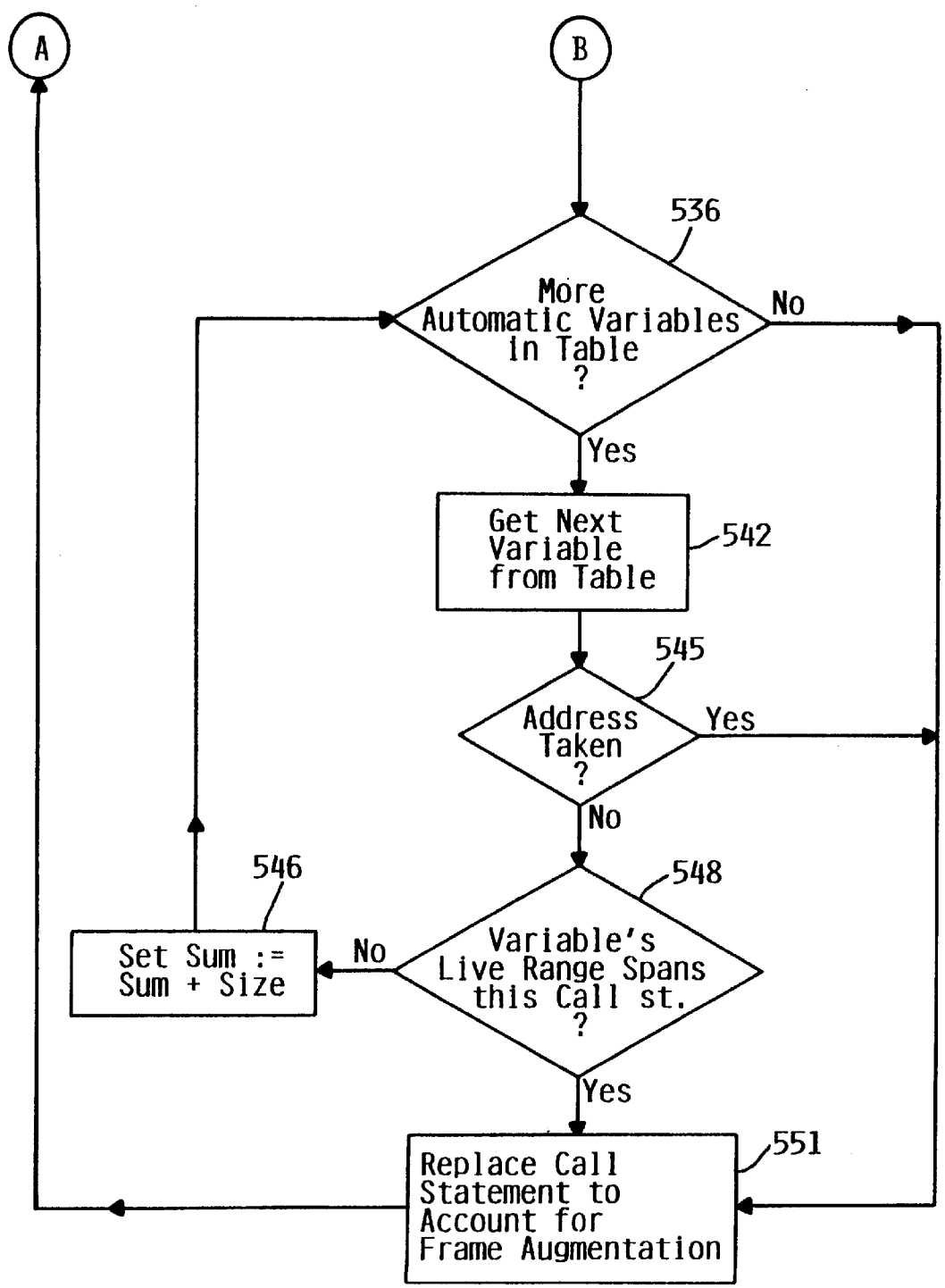

FIGS. 5A and 5B are diagrams that show the steps used to carry out the processing of call rewrite mechanism 160. Call rewrite mechanism 160 begins its processing in processing block 500 after having been invoked and passed the control flow graph and BLOCK by compiler 150. In processing block 506 call rewrite mechanism 160 investigates a basic block in the control flow graph and determines whether that basic block has been visited before. When call rewrite mechanism 160 finds a basic block that has been visited, it knows that its processing of the control flow graph is complete, so it returns control of CPU 105 to the calling program {processing block 509}. It should be noted that like call counter 155, call rewrite mechanism 160 is a recursive program, which means that the calling program will either be compiler 150 or a previous instance of call rewrite mechanism 160.

When call rewrite mechanism 160 finds a basic block that has not been previously processed, it marks the basic block as having been visited {processing block 510} and proceeds to processing block 530 of FIG. 5B (via connector block 512). In processing block 530, call rewrite mechanism 160 checks whether all of the statements within the subject basic block have been processed. If not, call rewrite mechanism 160 proceeds to processing block 518 if FIG. 5A. If there are more statements to process, call rewrite mechanism 160 gets the next statement {processing block 531} and determines whether the retrieved statement is a call statement {processing block 533}. If so, call rewrite mechanism 160 continues to retrieve statements until a call statement is encountered or all of the statements in the basic block have been considered {processing blocks 530, 531, and 533}. If a call statement in encountered in processing block 533, call rewrite mechanism 160 sets the program variable SUM equal to zero and determines whether each variable in the automatic variables table for the subject program has a live range that spans the particular call statement. Processing blocks 534 through 551 represent this processing. Call rewrite mechanism 160 first checks whether there are more automatic variables present in the automatic variables table that must be considered for this call statement {processing block 536}. In the first instance, of course, every program that has automatic variables will have variables to consider, and call rewrite mechanism 160 will retrieve those variables (one at a time) {processing block 542} and determines whether each variable's address has been taken {processing block 545}. If a variable's address has been taken, call rewrite mechanism 160 moves to processing block 351 where it replaces the subject call statement with another call statement that accounts for frame augmentation. The augmentation amount is contained in the program variable SUM. By frame augmentation we mean the amount that the stack pointer can be safely moved into the calling program's stack frame without overwriting information (variables) that are needed by the calling program when it resumes execution after the program that is the subject of the call statement returns.

If the variable's address is not found to have been taken in processing block 545, call rewrite mechanism 160 next determines whether the live range for this particular variable spans the call statement at issue {processing block 548}. Note here that the fact that a live range does not span a call statement means that it is not needed by the calling program after the called program (i.e., the program that is the subject of the call statement) returns, which in turn means that it can be overwritten at runtime when the called program's stack frame is placed on the stack. This logic is represented by processing block 546 where the frame augmentation amount is increased by the size of the variable being processed. If none of the addresses of any of the variables have been taken (as determined in processing block 545) and none of the variables have a live range that spans the subject call statement (as determined in processing block 548), call rewrite mechanism 160 moves to processing block 551 and rewrites the call statement, as has been previously described. In the preferred embodiment, call rewrite mechanism 160 rewrites call statements using an intermediate language. This intermediate representation is then used by compiler 150 to generate machine code (see processing block 227 of FIG. 2A). However, those skilled in the art will appreciate that the call rewrite mechanism 160 could be modified to directly generate machine code that included frame augmentation, which would obviate the need for processing block 227 of compiler 150.

When all of the automatic variables have been considered for all of the call statements within a basic block, call rewrite mechanism 160 moves back to processing block 518 of FIG. 5A {see connector block 527}. In processing block 518, call rewrite mechanism 160 determines whether there are more arcs (branches to other basic blocks) that leave the basic block being processed. If not, call rewrite mechanism 160 returns control of CPU 105 to a previously invoked instance of call rewrite mechanism 160 or to compiler 150. If there are more arcs out of the subject basic block, call rewrite mechanism 160 assigns the program variable NEXT to the basic block associated with the arc under consideration {processing block 521 } and makes a recursive call to itself with the control flow graph and the variable NEXT as passed parameters {processing block 524}. When this newly called instance of call rewrite mechanism 160 returns, the calling instance of call rewrite mechanism 160 will again determine if there are still more arcs from the subject basic block. This process will continue {processing blocks 518 through 524} until all of the arcs and all of the subarcs in the control flow graph have been processed. This processing has the effect of considering each call statement in each basic block of a control flow graph and rewriting each call statement to account for permissible frame augmentation.

When all of the call statements for the subject program have been rewritten, call rewrite mechanism 160 returns control to compiler 150. Returning now briefly to FIG. 2A, compiler 150 performs certain unrelated processing {processing block 225}, generates the machine code for the program {processing block 227}, and determines whether there are more programs in the program module that require processing {processing block 228}. If so, compiler repeats processing blocks 202 through 227 for the next program. If not compiler 150 terminates its processing in processing block 230. The machine code that is generated by compiler 150 is shown on FIG. 1 as optimized code 167. Optimized code 167 then executes on CPU 105 with a reduced need for stack space.

Figure 6:
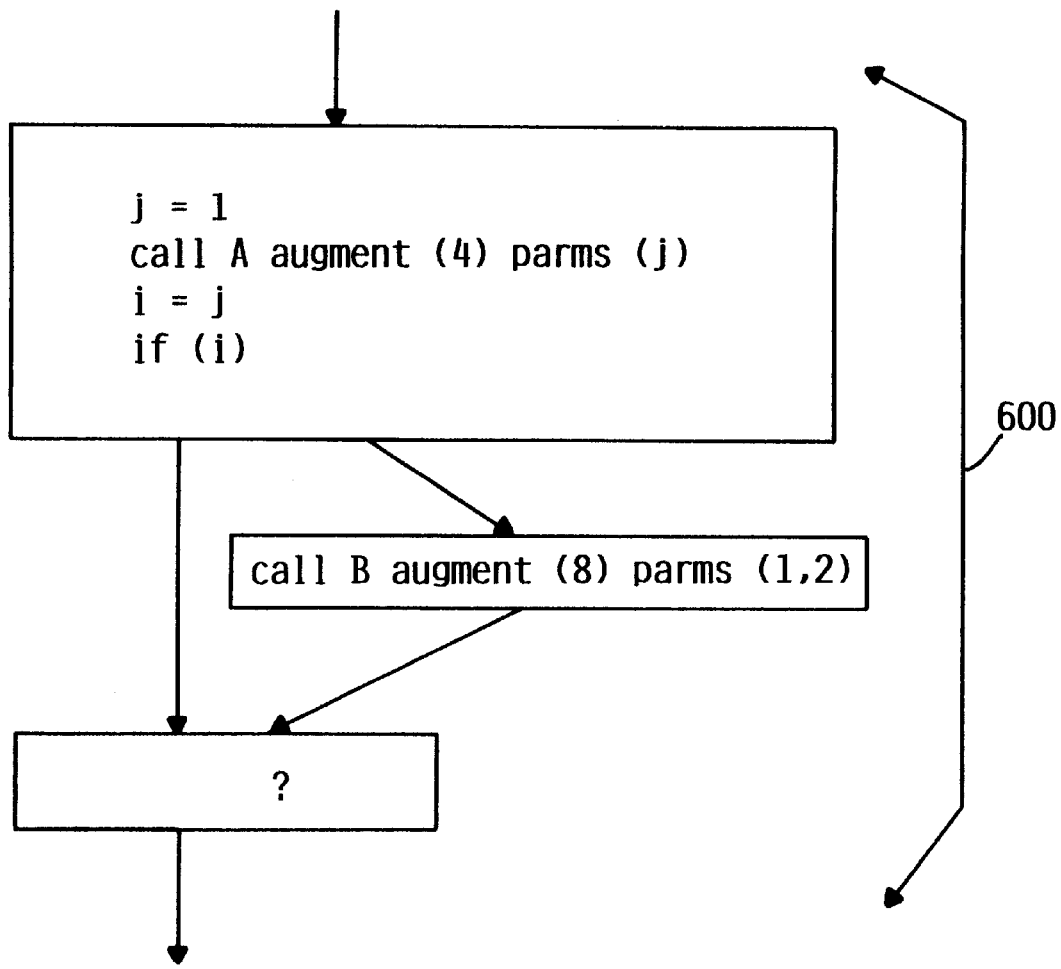
FIG. 6 is a diagram that shows the control flow graph that would result from the processing of the call rewrite mechanism of FIGS. 5A and 5B on the example control flow graph of FIG. 2C.
Figure 7:
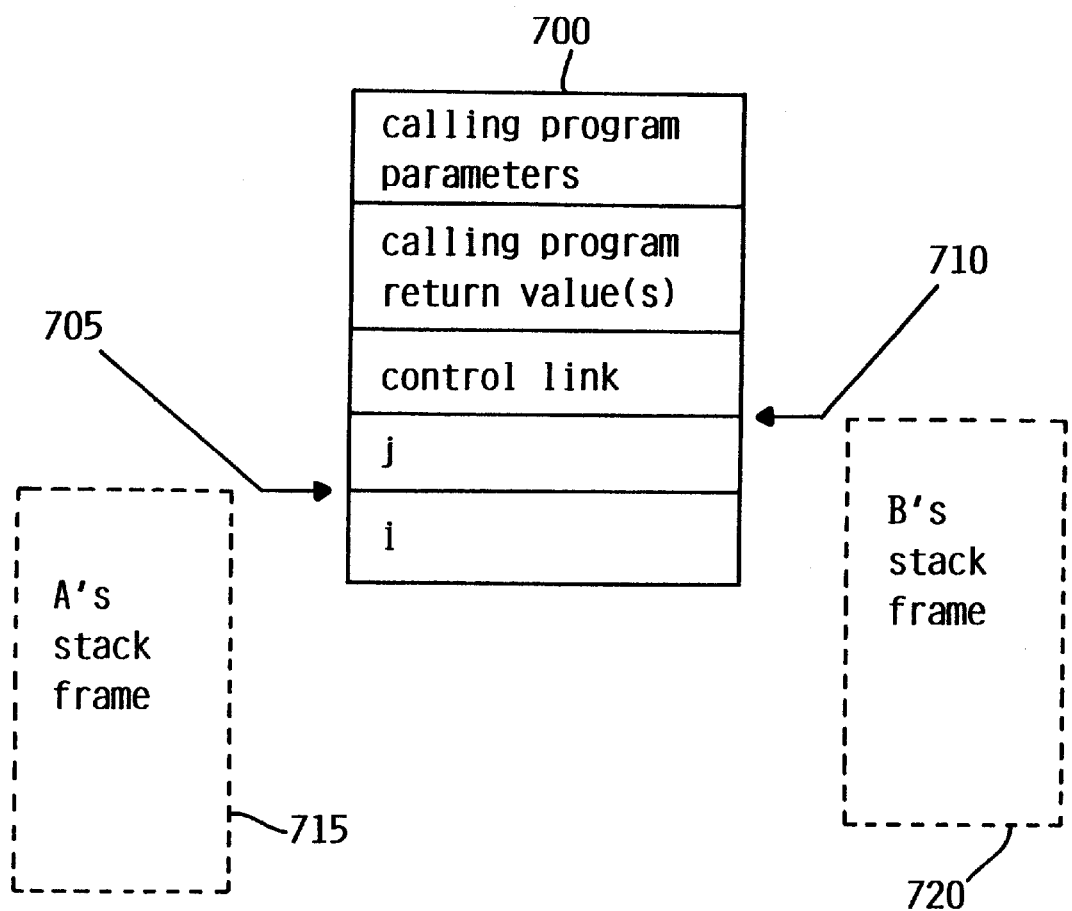
FIG. 7 is a diagram that shows the runtime stack that would result from execution of the program in the example control flow graph of FIG. 6.

FIG. 6 is a diagram that shows the control flow graph and the augmented call statements that would result from the processing of call rewrite mechanism 160 on example program 250 of FIG. 2C. As shown, the call to program A has been augmented by 4 bytes and the call to program B has been augmented by 8 bytes. As the reader will recall, the live range for variable "j" does span the call statement for the call to program A, but not the call statement for the call to program B, which means that it can be overwritten in program example ( )'s stack frame for the call to program B, but not for the call to program A. The live range for the variable "i," on the other hand, does not span either call statement, which means that it can be overwritten in program example ( )'s stack frame for the call to program B and for the call to program A. FIG. 7 shows stack frame 700, which is the runtime stack frame for program example( ) of FIG. 2C. Stack pointer 705 is the stack pointer that would be used for the placement of program A( )'s stack frame and stack pointer 710 is the stack pointer that would be used for the placement of program B( )'s stack from. As shown, these stack frames will overlay the stack frame for the program example( ) by the amounts specified in the rewritten augmented call statements.

ADVANTAGES

A first advantage of the present invention is that it provides an optimizing compiler that generates machine code that has a reduced need for main memory space.

A second advantage of the present invention is that it provides optimized programs that execute on a processor with a reduced need for main memory space.

A third advantage of the present invention is that it provides a compiler that identifies stackless variables of programs so that stack pointer can be adjusted to overwrite these stackless variables, thereby saving main memory space.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus comprising:

a processor;

memory connected to said processor; and a program stored in said memory, said program executing on said processor, said program containing a variable, said variable being stackless relative to at least one call statement contained in said program, said program storing said variable in said memory only when said variable is not considered stackless.

2. The apparatus of claim 1, wherein said program stores said variable in said memory when said program calls another program based on whether said variable is considered stackless relative to said another program.

3. A program product, said program product comprising:

a program, said program being capable of executing on a processor, said program containing a variable, said variable being stackless relative to at least one call statement contained in said program, said program storing said variable in said memory only when said variable is not considered stackless; and signal bearing media, said signal bearing media bearing said program.

4. The program product of claim 3, wherein said program stores said variable in said memory when said program calls another program based on whether said variable is considered stackless relative to said another program.

5. The program product of claim 3, wherein said signal bearing media is transmission-type media.

6. The program product of claim 3, wherein said signal bearing media is recordable media.

7. An apparatus, said apparatus comprising:
   a processor;
   memory connected to said processor; and
   a compiler stored in said memory, said compiler being used to compile source code, said compiler determining that a variable within said source code is stackless.

8. The apparatus of claim 7, wherein said compiler generates code and wherein said code stores said variable in said memory when said variable is not considered stackless.

9. The apparatus of claim 8, wherein said code stores said variable in said memory when said code calls a program based on whether said variable is considered stackless relative to said program.

10. A program product, said program product comprising:
    a compiler stored in said memory, said compiler being used to compile source code, said compiler determining that a variable within said source code is stackless; and
    signal bearing media, said signal bearing media bearing said compiler.

11. The program product of claim 10, wherein said compiler generates code and wherein said code stores said variable in said memory when said variable is not considered stackless.

12. The program product of claim 11, wherein said code stores said variable in said memory when said code calls a program based on whether said variable is considered stackless relative to said program.

13. The program product of claim 10, wherein said signal bearing media is transmission-type media.

14. The program product of claim 10, wherein said signal bearing media is recordable media.

15. A computer-implemented method, said method comprising the steps of:
    accessing source code; and
    identifying a variable as stackless in said source code.

16. The computer-implemented method of claim 15 further comprising the step of generating code that does not store said variable when calling programs for which said variable is considered stackless.

17. A computer-implemented method, said method comprising the step of:
    invoking a program, said program containing a variable, said program storing said variable when said variable is considered stackless; and
    terminating execution of said program.

18. The computer-implemented method of claim 17, wherein said program determines whether or not said variable is considered stackless when said program calls another program.

* * * * *

UNITED STATES PATENT AND TRADEMARK OFFICE
CERTIFICATE OF CORRECTION

PATENT NO.    : 5,946,492
DATED         : Aug. 31, 1999
INVENTOR(S)   : Cary Lee Bates It is certified that error appears in the above-identified patent and that said Letters Patent is hereby corrected as shown below:

Claim 1, Col. 10, Line 47, "An apparatus comprising:" should be --An apparatus, said apparatus comprising:--.

Signed and Sealed this

Twenty-eighth Day of March, 2000

Attest:

Q. TODD DICKINSON

*Attesting Officer*    *Commissioner of Patents and Trademarks*